United States Patent
Bauman et al.

(10) Patent No.: US 8,126,916 B2
(45) Date of Patent: *Feb. 28, 2012

(54) PRIORITY BASED LDAP SERVICE PUBLICATION MECHANISM

(75) Inventors: Charles D. Bauman, Sammamish, WA (US); Scott A. Piper, Bothell, WA (US); Gregory Pruett, Raleigh, NC (US); Carlos Santana, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 475 days.

This patent is subject to a terminal disclaimer.

(21) Appl. No.: 12/270,210

(22) Filed: Nov. 13, 2008

(65) Prior Publication Data

US 2009/0070470 A1    Mar. 12, 2009

Related U.S. Application Data

(63) Continuation of application No. 11/195,958, filed on Aug. 3, 2005, now Pat. No. 7,496,566.

(51) Int. Cl.
G06F 17/30    (2006.01)
(52) U.S. Cl. .................................. 707/781; 707/782
(58) Field of Classification Search .............. None
See application file for complete search history.

(56) References Cited

U.S. PATENT DOCUMENTS

| | | | |
|---|---|---|---|
| 5,968,121 A | 10/1999 | Logan et al. | |
| 6,167,449 A | 12/2000 | Arnold et al. | |
| 6,282,196 B1 * | 8/2001 | Lyons et al. | 370/394 |
| 6,490,619 B1 | 12/2002 | Byrne et al. | |
| 6,496,516 B1 * | 12/2002 | Dabecki et al. | 370/460 |
| 6,839,757 B1 | 1/2005 | Romano et al. | |
| 6,930,984 B1 | 8/2005 | Nomura et al. | |
| 7,584,262 B1 * | 9/2009 | Wang et al. | 709/217 |
| 2004/0019680 A1 | 1/2004 | Chao et al. | |
| 2004/0039803 A1 | 2/2004 | Law | |
| 2007/0025262 A1 * | 2/2007 | Yoshida et al. | 370/252 |

OTHER PUBLICATIONS

Schuhmann et al. A Frame for Adapting the Distribution of Automatic Application Configuration, Proceedings of the 5th international conference on Pervasive services, 2008 163-172.

* cited by examiner

*Primary Examiner* — Baoquoc To
(74) *Attorney, Agent, or Firm* — Lieberman & Brandsdorfer, LLC (57) ABSTRACT

A method and system are provided for directing a client to a preferred service instance. At creation of a service instance, the service binding attribute of the created instance is extended to include assigned domains and associated priorities. There are then two phases to directing a client to the preferred service instance. The first phase is compilation of a list of domains and priorities for the service in response to a query. Upon completion of the first phase, a second phase is executed to determine a preferred service for the client by comparing fully qualified domain name entries and assigned priority entries.

19 Claims, 5 Drawing Sheets

PRIORITY BASED LDAP SERVICE PUBLICATION MECHANISM

CROSS REFERENCE TO RELATED APPLICATION(S)

This application is a continuation of application Ser. No. 11/195,958, filed on Aug. 3, 2005, now pending, which is hereby incorporated herein by reference.

BACKGROUND OF THE INVENTION

1. Technical Field

This invention relates to identifying a service instance for a client from a standard directory service. More specifically, the selection of the service instance is based upon proximity of the client with regard to the service instance.

2. Description of the Prior Art

A directory service is a central point where network services, security services, and applications can form an integrated distributed computing environment. LDAP (Lightweight Directory Access Protocol) is a software protocol for providing directory service enablement to a large number of applications. LDAP is a "lightweight" version of DAP (Directory Access Protocol), which is part of X.500, a standard for directory services in a network. These applications range from e-mail to distributed system management tools. LDAP is an evolving protocol model based on the client-server model in which a client makes a TCP/IP connection to an LDAP server.

Figure 1:
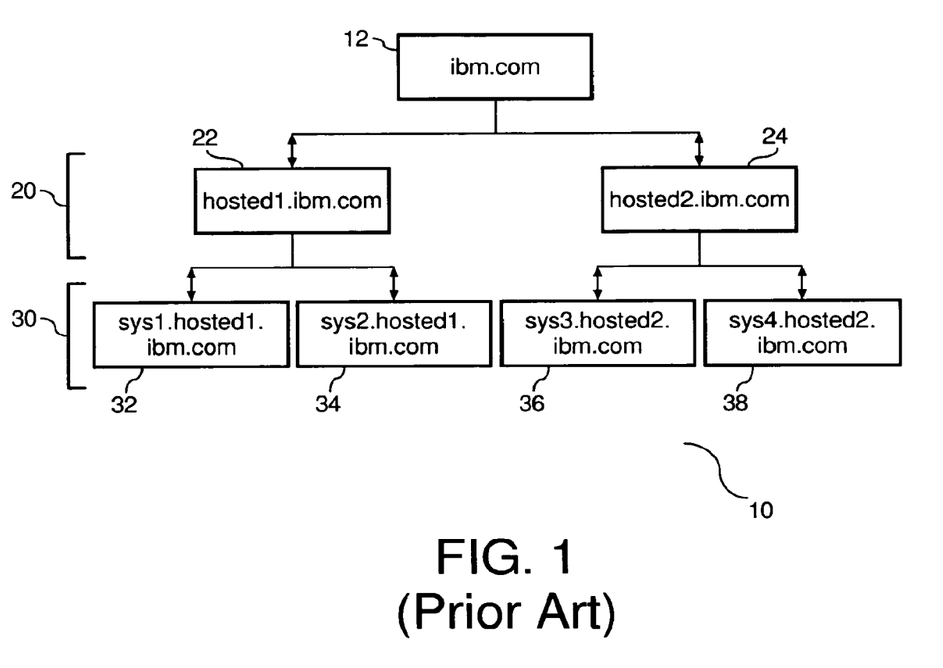
FIG. 1 is a block diagram of a prior art domain tree managed by an LDAP directory.

The LDAP information model is based on an "entry", which contains information about some object. Entries are typically organized in a specified tree structure, and each entry is composed of attributes. FIG. 1 is an example of an LDAP-managed domain tree shown organized in a simple tree hierarchy (10). The tree is made up of one or more domains, where a domain is a collection of one or more systems managed as a single security entity. In this example, the root domain (12) is shown as ibm.com, with an intermediate tier (20) having two intermediate nodes (22) and (24), and a final tier (30) having four leaf nodes (32), (34), (36), and (38). Intermediate node (22) is in communication with leaf nodes (32) and (34), and intermediate node (24) is in communication with leaf nodes (36) and (38). Multiple domains can be connected by trust relationships and share a common directory schema. The domains in the tree (10) share a contiguous namespace. One or more domain trees can be configured to trust one another and share a common schema, but not a contiguous namespace. A trust relationship among domain trees creates a forest. Any service, and any client of that service, in the directory forest can be located within a specified domain. Examples of a service include, but are not limited to, an instance of a service that directs clients to a Microsoft Terminal Services session running on servers in a data center. Similarly, examples of a client include, but are not limited to, a thin client, such as a terminal, that needs to contact the instance of the service to find out which server to connect to. In general, a network administrator would like a client to connect to an instance of the service that is close to that client on the network, while ensuring that no one instance of the service is overloaded.

Active Directory (AD) is a specific implementation of the LDAP protocol from Microsoft. Microsoft has defined a scheme for publishing services in AD specifically and in any LDAP-compliant directory in general. In this scheme, a service is represented by a directory class called a Service Connection Point (SCP). An instance of the SCP class is known as an SCP object. An SCP has at least two attributes, including service binding information and keywords. An attribute is a field associated with the SCP object to store SCP object associated data. The service binding information of the SCP object contains binding information that a client can use to connect to a specified instance of the service. The binding information is stored in a string format in an SCP attribute called Service Binding Information. The content of this string is service specific. For example, in the case of a web service, the binding information may be in the form of a URL. The keyword attribute of the SCP object is used to identify the type of service with which the SCP object is associated. In the prior art, it is known to associate a global unique identifier (GUID) with each type of service and to store the GUID in the keywords attribute. Through the SCP object and keywords, a client may locate an instance of a service. The query used to locate the instance of the service returns a list of multiple SCP objects to the client. However, the returned list does not direct the client to a preferred service instance.

Therefore, there is a need for a scheme that supports automatic location of a service on a network for a requesting client. The located service should be close to the client. At the same time, management of the instance of the service located for the client should prevent overload of the service instance.

SUMMARY OF THE INVENTION

This invention comprises a method and system for selecting a service instance for a client.

In one aspect of the invention, a computer system is provided with a client machine with a processor and memory, and a server machine with a processor and memory. The client machine is in communication with the server machine across a network. A service binding attribute of a service connection point is provided to store priority data of a service. The priority data includes adaptive domain data for domains served by a service instance and adaptive priority data associated with the domains. The priority data indicates a quality of a match of an associated service instance to the domain data. The client machine queries a directory of assigned domain and priority data to each service binding attribute to search for all instances of the service. In response to the query, the client machine receives a list of domain data associated with the priority data for each service instance. A client manager is provided to scan the list to find a match for the client to a preferred service instance. The scan by the client manager includes a determination of the preferred service instance for the client based upon both a comparison of domain data entry in the list with a domain data assignment to the client, and a comparison of a priority entry in the list with a priority assignment to the client in response to a comparison of the domain data entries resulting in maintenance of a current client assignment.

In a further aspect of the invention, an article is provided with a computer useable storage medium to store data in a service binding attribute of a service connection point. The data includes adaptive domain data for domains served by the service instance and adaptive priority data associated with the domains. The priority data indicates quality of a match of an associated service instance to domain data. The medium embodies computer usable program code for directing a client to a preferred service instance on a server. The computer program code includes computer useable program code to query a directory of compiled assigned domain and priority data to each service attribute for all instances of a service. Computer program code is also provided to receive a list of domain data associated with the priority data for each service instance in response to the query, and to scan the list for a match for a client machine to a preferred service instance. This includes determining a preferred service instance for the client based upon a comparison of a domain data entry in the list with a domain data assignment to the client, and a comparison of a priority entry in the list with a priority assignment to the client in response to a comparison of the domain data entries resulting in maintaining a current client assignment.

In yet a further aspect of the invention, an article is provided with a computer useable data storage medium embodying computer usable program code for directing a client to a preferred service instance of a server. The computer program code includes instructions in the form of querying a directory of compiled assigned domain and priority data to each service attribute for all instances of a service, receiving a list of domain data associated with the priority data for each service instance in response to the query, and scanning the list for a match for a client machine to a preferred service instance. The instructions determine a preferred service instance for the client based upon a comparison of a domain data entry in the list with a domain data assignment to the client, and a comparison of a priority entry in the list with a priority assignment to the client responsive to a comparison of the domain data entries resulting in maintaining a current client assignment.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

A list of domains and associated priorities for an instance of a service are specified at the time a service instance is installed. Fully qualified domain names (FQDNs), hereinafter referred to as domain data, are stored in a service binding attribute of a newly created service connection point (SCP). A fully qualified domain name (FQDN) is that portion of an Internet Uniform Resource Locator (URL) that fully identifies the server program that an Internet request is addressed to. Logic is provided to retrieve the SCPs associated with a service in which a requesting client is interested in accessing. This logic selects a preferred service instance for the requesting client based upon a comparison of the domain names and the priorities stored in the SCP.

Technical Details

The following description is associated with locating a service on a network of interconnected computers. The SCP object's attributes are extended to include data in the form of a string at the time the service is installed. In one embodiment, service installation logic solicits and stores the extended data in a service binding attribute of a newly created SCP. The data includes a URL, domain data, and priority data. The URL is a uniform resource locator and specifies a location on the network where the client can find an instance of the service. The format of the URL is service specific. The priority data is a positive integer that indicates how good a match the corresponding instance of the service is for the domain data. In one embodiment, an integer value of one may designate the highest priority. The domain data consists of a host and a domain name, including top-level domain. For example, www.ibm.com is a fully qualified domain name, with www serving as the host, ibm is the second-level domain, and .com is the top level domain. Domain data always starts with a host name and continues all the way up to the top-level domain name. Furthermore, domain data identifies a domain associated with the instance of the service in question.

There is no modification to the service, only to the SCP representing an instance of the service. Following installation of the service(s) and upon querying the directory for all instances of a service, the client will receive a list of SCP objects, one per service instance. Each returned SCP object will include a string having a URL, domain data, and priority data in a service binding information attribute. The client must determine the domain in which it itself resides, and then select a preferred instance of the service from the returned list.

Figure 2:
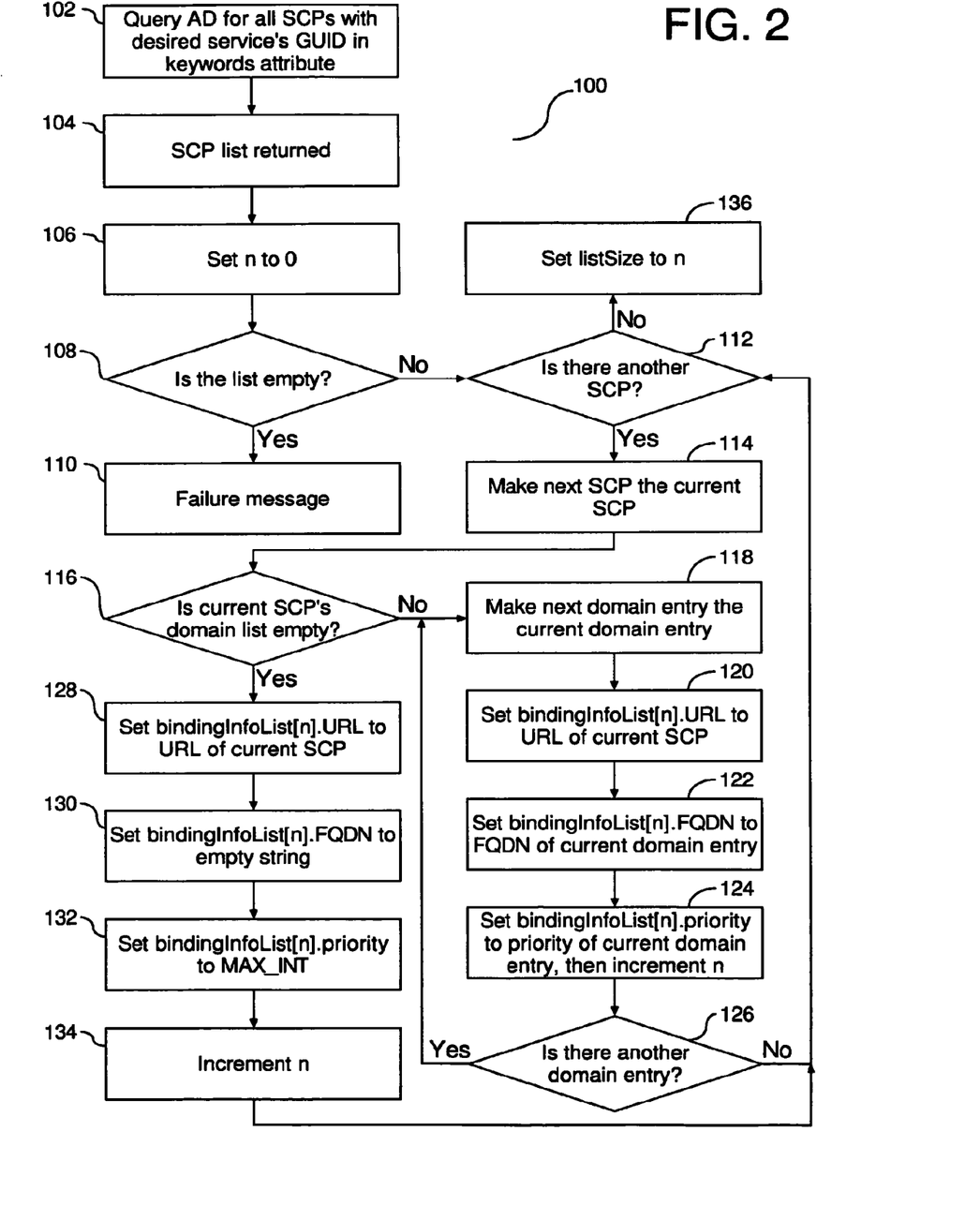
FIG. 2 is flow chart illustrating a method for constructing a list of binding information items in response to a directory query according to the preferred embodiment of this invention, and is suggested for printing on the first page of the issued patent.

FIG. 2 is a flow chart (100) illustrating a first part of the search process which includes constructing a list of binding information items. Initially, a directory is queried for all SCPs having a globally unique identifier of the desired service in the keyword attribute (102). A list of all SCPs is returned to the client initiating the query (104). Thereafter, a counting variable, n, is set to zero (106) followed by a query (108) to determine if the list returned at step (104) is empty. A positive response to the query at step (108) is an indication that no SCPs were returned at step (104) and a fail message is returned to the client (110). However, a negative response to the test at step (108) will result in entering a loop for generating a list of binding information items. Accordingly, the first part of the list constructing process extracts a list of binding information items from the directory.

After the list of all SCPs has been obtained, pairs of domain data and associated priority data are extracted from each entry in the list. The extraction process includes a query (112) to determine if there is another SCP in the list returned at step (104). A positive response to the test at step (112) will cause the next SCP in the list to be assigned the current SCP for review (114). Thereafter, a test is conducted to determine if a domain list of the current SCP under review is empty (116). Since a single SCP may return multiple pairs of domain and priority data, the domain list refers to a listing of pairs of domain and priority data. A negative response to the test at step (116) will result in use of an extraction loop to obtain an SCP output list, i.e. a list of data extracted from the domain list. For example, each listing in the SCP output list will include a URL, domain data, and priority data. The next domain entry is assigned the position of the current domain entry (118), followed by extracting the URL of the current SCP and assigning it to a variable (120), extracting the domain data of the current domain entry and assigning it to a variable (122), and extracting the priority of the current domain entry and assigning it to a variable (124). Each of the variable assignments at steps (120), (122), and (124) are preferably associated with the current value of the counting variable, n. At the end of step (124), the counting variable, n, is incremented. Following step (124), a test (126) is conducted to determine if there is another domain entry in the list returned at step (104). A positive response to the test at step (126) will result in a return to step (118). Similarly, a negative response to the test at step (126) will result in a return to step (112). Accordingly, for each SCP in the list in which the domain list is not empty, the URLs, the domain data, and the priority data are extracted and assigned to variables.

If a response to the test at step (116) is positive, this is an indication that the domain list of the SCP under review is empty. The URL of the current SCP is extracted and assigned to a variable (128). A domain data variable of the current SCP is set to an empty string (130), and the priority of the current SCP is set to the largest integer value that can be represented by an integer on the system (132). Each of the variable assignments at steps (128), (130), and (132) are preferably associated with the current value of the counting variable, n. Following step (132), the counting variable n is incremented (134), and the process returns to step (112). At such time as a negative response to the test at step (112) is received, this is an indication that there are no more SCPs in the list generated at step (104). A variable, listsize, representing the size of the list is then set to the current value of the counting variable, n, (136) to indicate how many pairs of domain data and priority data were extracted from the list returned at step (104). Accordingly, the first part of the process illustrates extracting the binding information data from the SCP list in response to a directory query.

Figure 3A:
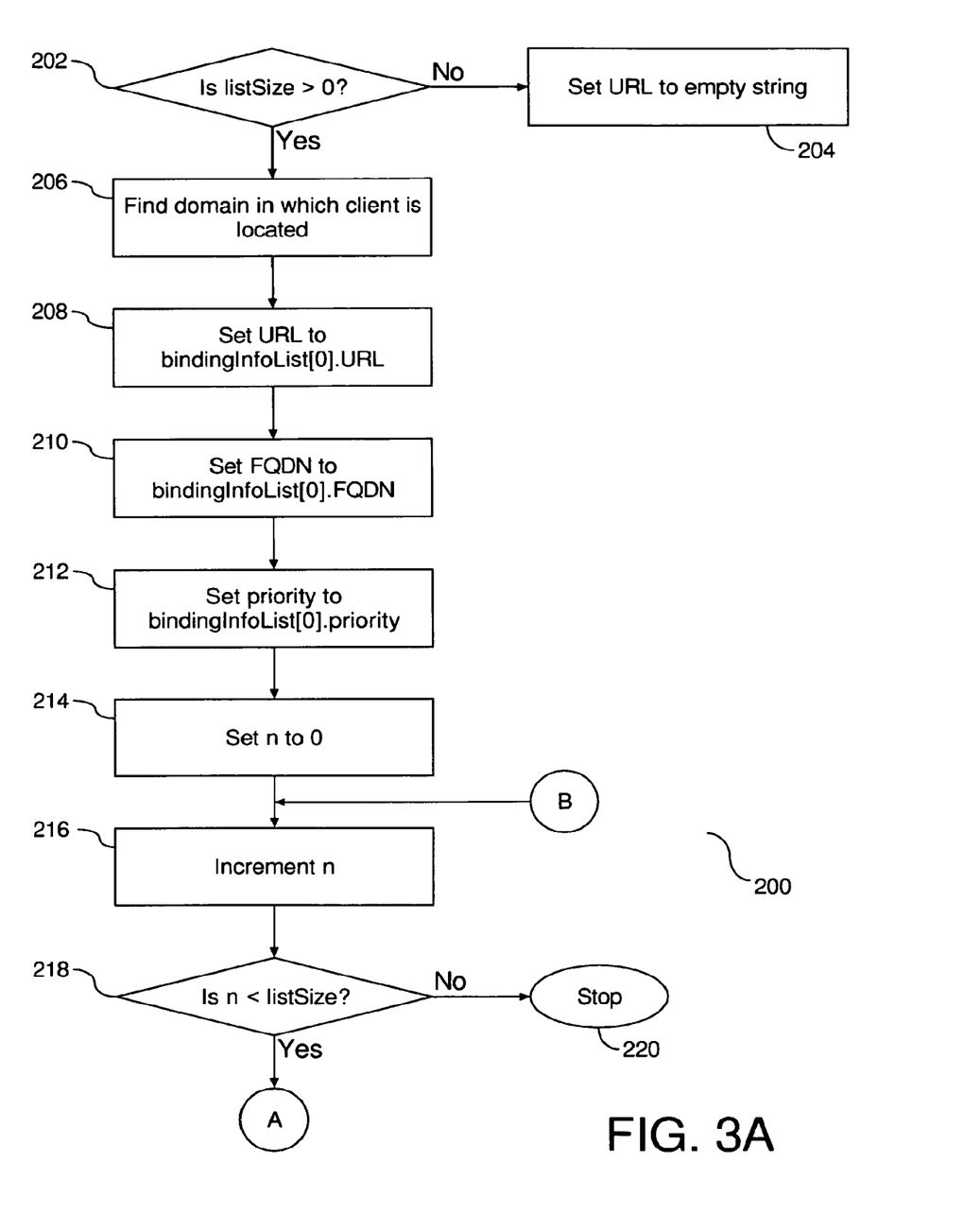
FIGS. 3a and 3b are flow charts illustrating a method for selecting a preferred service instance for a client from the list of binding information items.
Figure 3B:
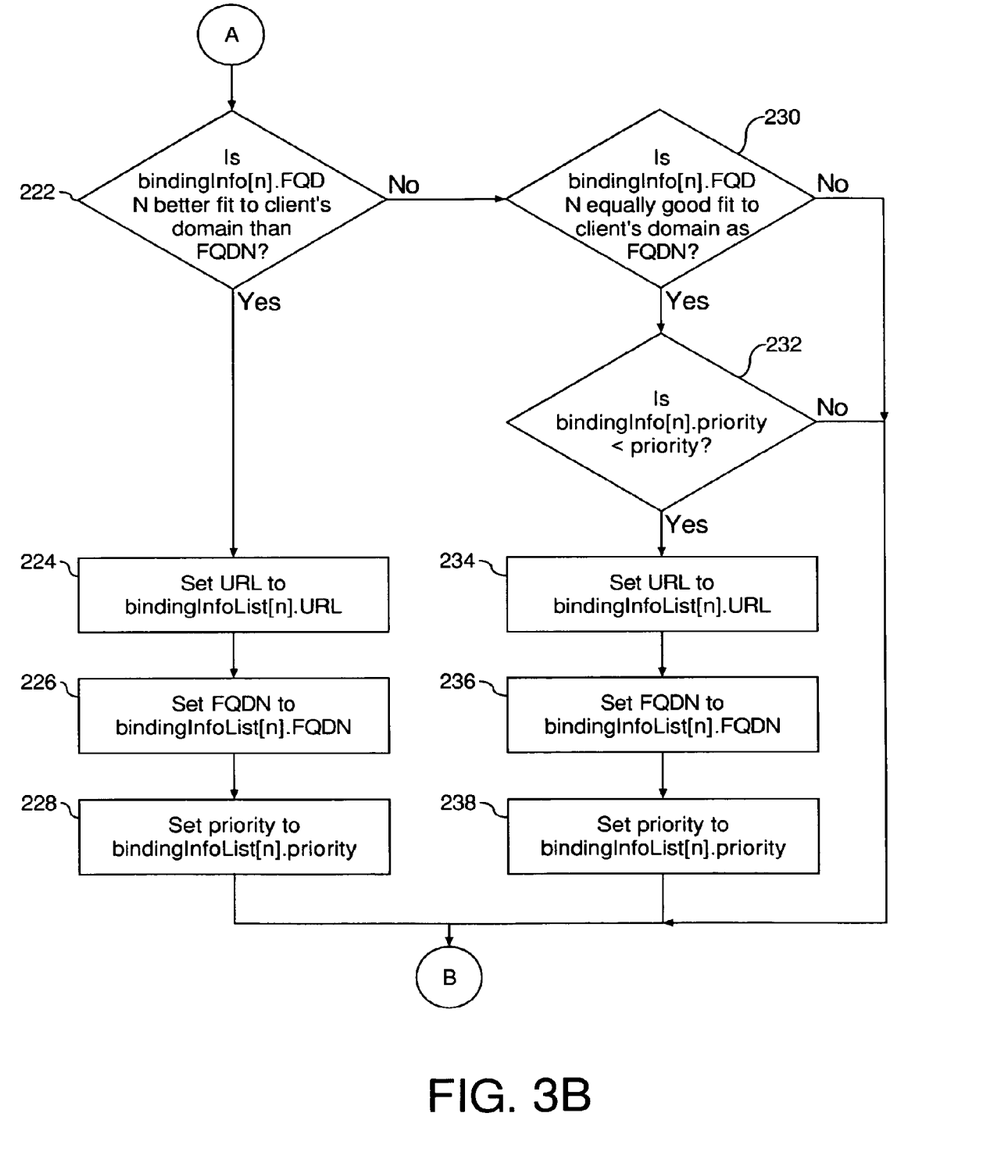

Once the binding information list is constructed, the client can scan this list to find the URL in the list that provides the preferred service instance for the client. FIG. 3 is a flow chart (200) illustrating a process of finding a preferred service instance. Initially, a test is conducted to determine if the size of the list as assigned at step (136) is greater than zero (202). A negative response to the test at step (202) will result in setting the URL to an empty string (204). However, a positive response to the test at step (202) will result in finding the domain in which the client is located (206). In one embodiment, the query at step (206) is conducted in the form of a system call to determine the client's domain. Following step (206), the first entry in the list generated in FIG. 2 is reviewed. The URL of the first entry in the list is assigned a variable (208). The domain data of the first entry in the list is assigned a variable (210), and the priority of the first entry in the list is assigned a variable (212). The assignments in steps (208), (210), and (212) are all saved in memory. Each of the assignments at steps (208), (210), and (212) takes the first entry in the list generated in FIG. 2 and assumes the first entry is the preferred service instance for the client. Following the assignments for the URL, domain data, and priority data, the counting variable, n, is set to zero (214). Accordingly, the first part of the process for finding the preferred service instance saves the information of the first service instance in the binding information list in memory.

Following step (214), the remainder of the binding information list is scanned to determine if there is an entry in the list that is a better service instance for the client. The first step in the scanning process is to increment the counting variable, n (216). Thereafter, a test is conducted to determine if there is another entry in the list (218). In one embodiment, the test at step (218) may determine if the counting variable is less than the variable associated with the size of the list. A negative response to the test at step (218) is an indication that there are no more entries in the list to review and the current assignment set at steps (208), (210), and (212) identifies the best service instance for the client (220). However, a positive response to the test at step (218) will result in a test to determine if the next domain data entry in the binding information list is a better fit for the client's domain than the current domain assignment to the client (222). A better fit is one that involves a more specific match of domain data to the client's domain. Meaning, a better match will have more components of the domain data. For example, if the client is in domain hosted.clients.ibm.com, a service instance serving any of "hosted.clients.ibm.com", "clients.ibm.com", "ibm.com", or an empty string would be acceptable, but the most specific match is to be preferred. So, in this case, instances serving the specific domain hosted.clients.ibm.com would be preferred. An instance with an empty domain list can serve clients in any domain, but is considered the most general match, and thus chosen only as a last resort. A positive response to the test at step (222) will result in setting the URL of the current entry in the list and assigning it to a variable reflective of the current entry (224). In addition, the domain data of the current entry in the list is assigned a variable reflective of the current entry (226), and the priority of the current entry in the list is set to a variable reflective of the current entry (228). The assignments in steps (224), (226), and (228) are all saved in memory and replace any prior entry that was previously saved in memory. Similarly, a negative response to the test at step (222) will result in a test to determine if the next domain in the binding information list is an equally good fit for the client's domain as the current domain assignment to the client (230). The next domain and the current domain are equally good fits for the client's domain if the two domains are identical, including the case where both FQDNs are blank. A positive response to the test at step (230) will result in a final test for the current entry in the list to determine if the priority for the current entry in the binding information list is less than the current priority assignment to the client (232). The test at step (232) is calibrated for a system where a lower value priority integer reflects a higher priority rating. In the case of a system calibrated for the opposite logic, the test at step (232) may be reversed. A positive response to the test at step (232) results in setting the URL of the current entry in the list and assigning it to a variable reflective of the current entry (234). In addition, the domain data of the current entry in the list is assigned a variable reflective of the current entry (236), and the priority of the current entry in the list is set to a variable reflective of the current entry (238). The assignments in steps (234), (236), and (238) are all saved in memory and replace any prior entry that was previously saved in memory. Following step (228), (238), or a negative response to the tests at steps (230) or (232), the process returns to step (216). Accordingly, the process of selecting the best service instance for the client entails comparing domain data and priority data for entries in the binding information list.

If at the conclusion of the process outlined in FIG. 3 the URL is empty, this indicates a failed search. Conversely, if the URL is not empty, the client may attempt to connect to the URL assigned to the client with the logic presented in FIG. 3. A failed connection attempt will cause the corresponding entries in the binding information list to be removed from the list. The client can then enter the process for parsing the data from the list, as outlined in FIG. 3, until the client finds a responsive service instance or exhausts all service instances.

Figure 4:
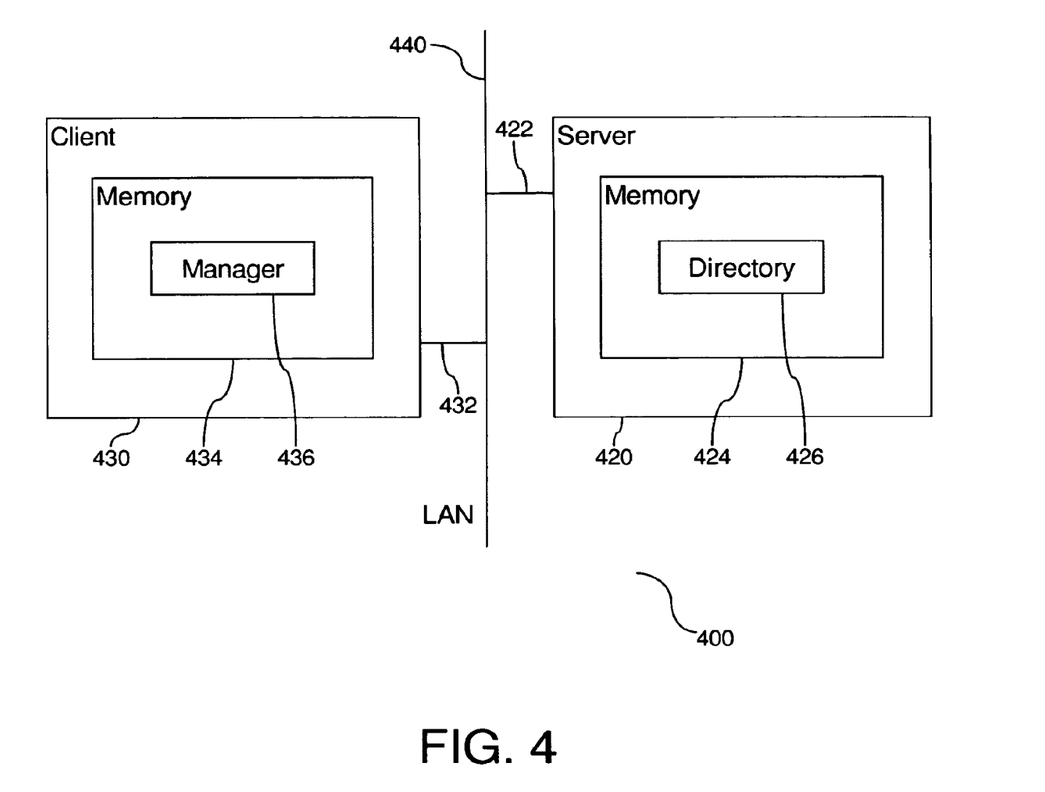
FIG. 4 is a block diagram of a server and client embodying the physical elements of the tool.

The method for directing a client to a preferred service instance may be invoked in the form of a tool that includes a directory embedded within a server and a manager embedded within a client, wherein the client and server communicate across a network connection. FIG. 4 is a block diagram (400) of a server (420) and a client (430). As shown, the server (420) includes memory (424) with a directory (426) embedded therein. The server (420) includes a connection (422) to a network (440). Similarly, the client (430) includes memory (434) with a client manager (436) embedded therein. The client (420) also includes a connection (432) to the network (440). The quantity of servers and clients are merely an illustrative quantity. The system may be enlarged to include additional clients and servers. The directory (426) maintains assigned domains and priorities in a service binding attribute for an instance of a service. As noted above, the associated domains and priorities are solicited at the time a service is installed. The manager (436) is a tool that queries the directory for all instances of a specified service. The manager (436) generates a list of domains and priorities of the specified service. In addition to generating the list, the client manager (436) scans the list to select a match of the preferred service instance for the client (430).

In one embodiment, the invention is implemented in software, which includes but is not limited to firmware, resident software, microcode, etc. The software implementation can take the form of a computer program product accessible from a computer-useable or computer-readable medium providing program code for use by or in connection with a computer or any instruction execution system. As shown in FIG. 4, both the server (420) and the client (430) include memory (424) and (434), respectively. The server memory (424) includes a directory (426) embedded therein, and the client memory (434) includes a manager (436) embedded therein. The directory and its associated information are stored within memory (424) of the server (420). The client manager (436) is provided to communicate with the directory (426) of the server (420) across the network (440) to query the directory and to select a preferred service instance for the client in response to the query. For the purposes of this description, a computer-useable or computer-readable medium can be any apparatus that can contain, store, communicate, propagate, or transport the program for use by or in connection with the instruction execution system, apparatus, or device.

Advantages Over the Prior Art

For each service instance in a directory, an administrator has to specify a list of domains and associated priorities for each service instance. The administrator does not have to specify a client in the network. The binding information string that contains the domains and associated priorities is specified at the time the service is installed. The query requires use of only two SCP attributes, the keywords and the service binding information attributes. By specifying high priorities for domains that are close to the service instance, the administrator can locate a service instance close to the client. If the preferred service instance for a client is not responsive, the client can select the next instance on the list of returned service instances.

Alternative Embodiments

It will be appreciated that, although specific embodiments of the invention have been described herein for purposes of illustration, various modifications may be made without departing from the spirit and scope of the invention. In particular the representation of priorities by positive integers, or the sequence of the operations in comparing the URL, domain data, and priority data may be altered. Accordingly, the scope of protection of this invention is limited only by the following claims and their equivalents.

We claim:

1. A computer system comprising:
a client machine with a processor and memory;
a service binding attribute of a service connection point to store data of a service, said data including adaptive domain data for domains served by a service instance and adaptive priority data associated with said domains, said data to indicate a quality of a match of an associated service instance to said domain data;
said client machine to query a directory of assigned domain and priority data to each service binding attribute to search for all instances of said service;
in response to said query, said client machine to receive a list of domain data associated with said priority data for each service instance; and
a client manager adapted to scan said list to find a match for said client to a preferred service instance, including a determination of said preferred service instance for said client based upon a comparison of domain data entry in said list with a domain data assignment to said client, and a comparison of a priority entry in said list with a priority assignment to said client responsive to a comparison of said domain data entries resulting in maintenance of a current client assignment.

2. The system of claim 1, further comprising a directory of assigned domain data and priority data associated with each service to be compiled.

3. The system of claim 2, further comprising each item in said directory having a fully qualified domain name and an associated priority.

4. The system of claim 2, wherein said list includes one item per pair of fully qualified domain name and an associated priority.

5. The system of claim 1, wherein the find of a match for the client to a preferred service further comprising the client manager to compare a priority entry in said list with a priority assignment to said client responsive to a comparison of said domain data entries resulting in maintenance of a current client assignment.

6. The system of claim 5, further comprising a directory of assigned domain and priority data associated with each service to be compiled.

7. An article comprising:
a computer useable storage medium to store data in a service binding attribute of a service connection point, said data to include adaptive domain data for domains served by said service instance and adaptive priority data associated with said domains, said priority data to indicate quality of a match of an associated service instance to domain data;
the medium embodying computer usable program code for directing a client to a preferred service instance, said computer program code including:
computer useable program code for querying a directory of compiled assigned domain and priority data to each service attribute for all instances of a service;
computer useable program code for receiving a list of domain data associated with said priority data for each service instance in response to said query; and
computer useable program code for scanning said list for a match for a client machine to a preferred service instance, including determining a preferred service instance for said client based upon: a comparison of a domain data entry in said list with a domain data assignment to said client, and a comparison of a priority entry in said list with a priority assignment to said client responsive to a comparison of said domain data entries resulting in maintaining a current client assignment.

8. The article of claim 7, further comprising computer useable program code for compiling a directory of assigned domain data and priority data associated with each service instance.

9. The article of claim 8, further comprising each item in said directory having a fully qualified domain name and an associated priority.

10. The article of claim 8, wherein said list includes one item per paid of fully qualified domain name and an associated priority.

11. The article of claim 8, further comprising returning the match to the client.

12. An article comprising:
  a computer useable data storage medium embodying computer usable program code for directing a client to a preferred service instance, said computer program code including instructions comprising:
    instructions to query a directory of compiled assigned domain and priority data to each service attribute for all instances of a service;
    instructions to receive a list of domain data associated with said priority data for each service instance in response to said query; and
    instructions to scan said list for a match for a client machine to a preferred service instance, including determining a preferred service instance for said client based upon a comparison of a domain data entry in said list with a domain data assignment to said client, and a comparison of a priority entry in said list with a priority assignment to said client responsive to a comparison of said domain data entries resulting in maintaining a current client assignment.

13. The article of claim 12, further comprising the computer useable storage medium to store data in a service binding attribute of a service connection point, said data to include adaptive domain data for domains served by said service instance and adaptive priority data associated with said domains.

14. The article of claim 13, further comprising said priority data to indicate quality of a match of an associated service instance to domain data.

15. The article of claim 12, further comprising instructions to compile a directory of assigned domain data and priority data associated with each service instance.

16. The article of claim 15, further comprising each item in said directory having a fully qualified domain name and an associated priority.

17. The article of claim 15, wherein said list includes one item per paid of fully qualified domain name and an associated priority.

18. The article of claim 12, further comprising returning the match to the client.

19. A computer system comprising:
  a client machine with a processor and memory;
  a service binding attribute of a service connection point to store data of a service, said data including adaptive domain data for domains served by a service instance and adaptive priority data associated with said domains, said priority data to indicate a quality of a match of an associated service instance to said domain data;
  said client machine to query a directory of assigned domain and priority data to each service binding attribute to search for all instances of said service;
  in response to said query, said client machine to receive a list of domain data associated with said priority data for each service instance; and
  a client manager adapted to scan said list to find a match for said client to a preferred service instance, including a determination of said preferred service instance for said client based upon a comparison of domain data entry in said list with a domain data assignment to said client.

* * * * *